(12) United States Patent
Hagiwara

(10) Patent No.: US 6,813,971 B2
(45) Date of Patent: Nov. 9, 2004

(54) MOLDED GEAR

(75) Inventor: Toru Hagiwara, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/865,382

(22) Filed: May 25, 2001

(65) Prior Publication Data
US 2002/0021043 A1 Feb. 21, 2002

(30) Foreign Application Priority Data
May 25, 2000 (JP) .................................. 2000-154127

(51) Int. Cl.$^7$ ................................................ F16H 57/04
(52) U.S. Cl. ................. 74/431; 74/606 A; 74/DIG. 10; 416/60
(58) Field of Search ................. 74/431, 434, 606 A, 74/DIG. 10; 416/60

(56) References Cited

U.S. PATENT DOCUMENTS

| | | | | |
|---|---|---|---|---|
| 2,783,733 A | * | 3/1957 | Chertoof | 116/137 A |
| 3,789,684 A | * | 2/1974 | Freier, Jr. | 474/7 |
| 4,022,074 A | * | 5/1977 | Mabuchi et al. | 310/62 |
| 4,433,964 A | * | 2/1984 | Holtzberg et al. | 123/90.31 |
| 4,982,705 A | * | 1/1991 | Hudson | 123/41.65 |
| 6,209,528 B1 | * | 4/2001 | Kondo | 123/565 |

FOREIGN PATENT DOCUMENTS

| | | | |
|---|---|---|---|
| JP | 59-18223 | * | 1/1984 |
| JP | 04-102754 | * | 4/1992 |
| JP | 10-196767 | * | 7/1998 |
| JP | 10-278124 | * | 10/1998 |

* cited by examiner

Primary Examiner—William C. Joyce
(74) Attorney, Agent, or Firm—Koda & Androlia

(57) ABSTRACT

An injection-molded plastic gear 1 as a molded gear includes a plurality of teeth 12 formed around an outer periphery of a rim, and a plurality of blades 8 formed at distances circumferentially on an inner peripheral surface of the rim 11 to produce an axial flow of air. A radially inner portion is formed on the side of inner peripheries of the blades 8 to support the rim 11 through the blades 8. When such injection-molded plastic gear 1 is rotated, the blades 8 produce an axial flow of air passed through holes 10 from the surface side to the back side. The flow of air can be blown to a part such as an IC, a motor and the like disposed adjacent the molded gear to cool it, and the heat of the teeth 12 and the rim 11 can be taken away by a heat transfer, whereby the teeth 12 and the rim 11 can be cooled. Thus, the injection-molded plastic gear 1 has a function as a cooling fan, whereby a forcible convection (flow of air) can be produced in a gear-accommodated space.

6 Claims, 7 Drawing Sheets

MOLDED GEAR

BACKGROUND OF THE INVENTION

1. Field of the Invention

The present invention relates to a molded gear formed by cooling and solidifying a molten material such as a plastic, a metal and the like in a mold, and particularly, to a molded gear having a function as a cooling fan.

2. Description of the Related Art

In recent years, many injection-molded plastic gears as molded gears are used in an Office Automation (OA) system, an Audio Visual (AV) system, an electric/electronic system, and an automobile part or the like. Such injection-molded plastic gear has a light weight and a self-lubricating property; generates a noise lower than that in a metal gear, and can be produced in bulk, leading to an economic advantage. Therefore, the injection-molded plastic gear has been utilized in a further widened range of application.

However, such injection-molded plastic gear has a relatively poor thermal conductivity and for this reason, heat is liable to be accumulated in the tooth faces and hence, the plastic gear has a characteristic that its mechanical nature is dependent on the heat.

In recent years, the OA system, the AV system or the like is designed at a reduced size, so that the space for accommodation of the gear is smaller, but also an unoccupied space is as small as possible. Therefore, even when the cooling of the part is required in the OA system, the AV system or the like, a cooling fan cannot be disposed freely in some cases.

SUMMARY OF THE INVENTION

Accordingly, it is an object of the present invention to provide a molded gear having a function as a cooling fan, so that a forcible convection (flow of air) can be produced within a space having the molded gear accommodated therein.

To achieve the above object, according to a first aspect and feature of the present invention, there is provided a molded gear made with a plurality of teeth formed around an outer periphery thereof by cooling and solidifying a molten material in a mold, comprising a plurality of holes defined circumferentially in a portion radially inner than the teeth to extend through such radially inner portion from a surface to a back, and blades formed at side edges of the holes.

With such configuration, when the molded gear is rotated, a flow of air passed through the holes from the surface side to the back side of the molded gear can be generated by the blades and blown to a part such as an integrated circuit (IC), a motor and the like disposed adjacent the molded gear to cool it, and heat-accumulated air around the IC, the motor or the like can be forcibly discharged to inhibit the rise in ambient temperature. Particularly, the molded gear according to the present invention has the fan function and hence, it is possible to supply air to an area whore a fan cannot be specifically placed, thereby cooling such area. In the molded gear according to the present invention, the holes are defined adjacent the teeth and the blades are formed at side edges of the holes. In this case, the flow of air is produced by the blades to flow in the vicinity of the teeth, whereby the heat in the teeth and in the vicinity of the teeth can be taken away by the heat transfer and hence, the cooling of the teeth and an area in the vicinity of the teeth cab be achieved effectively.

According to a second aspect and feature of the present invention, there is provided a molded gear made with a plurality of teeth formed around an outer periphery of a rim by cooling and solidifying a molten material in a mold, comprising a plurality of blades formed at distances circumferentially on an inner peripheral surface of the rim, and a radially inner portion formed on the side of inner peripheries of the blades to support the rim through the blades.

With such configuration, when the molded gear is rotated, the blades generate a flow if air directed from a surface to a back of the molded gear. As a result, a flow of air is along the inner peripheral surface of the rim is produced, and the heat of the teeth and the rim is taken away by such flow of air, whereby the teeth and the rim are cooled. Thus, a reduction in mechanical strength of the molded gear due to a rise in temperatures of the teeth and the rim is inhibited. In addition, according to the present invention, the axial flow of air produced by the blades is blown to another part disposed adjacent the molded gear and hence, the part disposed adjacent the molded gear can be cooled.

The above and other objects, features and advantages of the invention will become apparent from the following description of the preferred embodiments taken in conjunction with the accompanying drawings.

DESCRIPTION OF THE PREFERRED EMBODIMENTS

The present invention will now be described by way of embodiments with reference to the accompanying drawings.

A first embodiment of the present invention will be first described.

Figure 1:
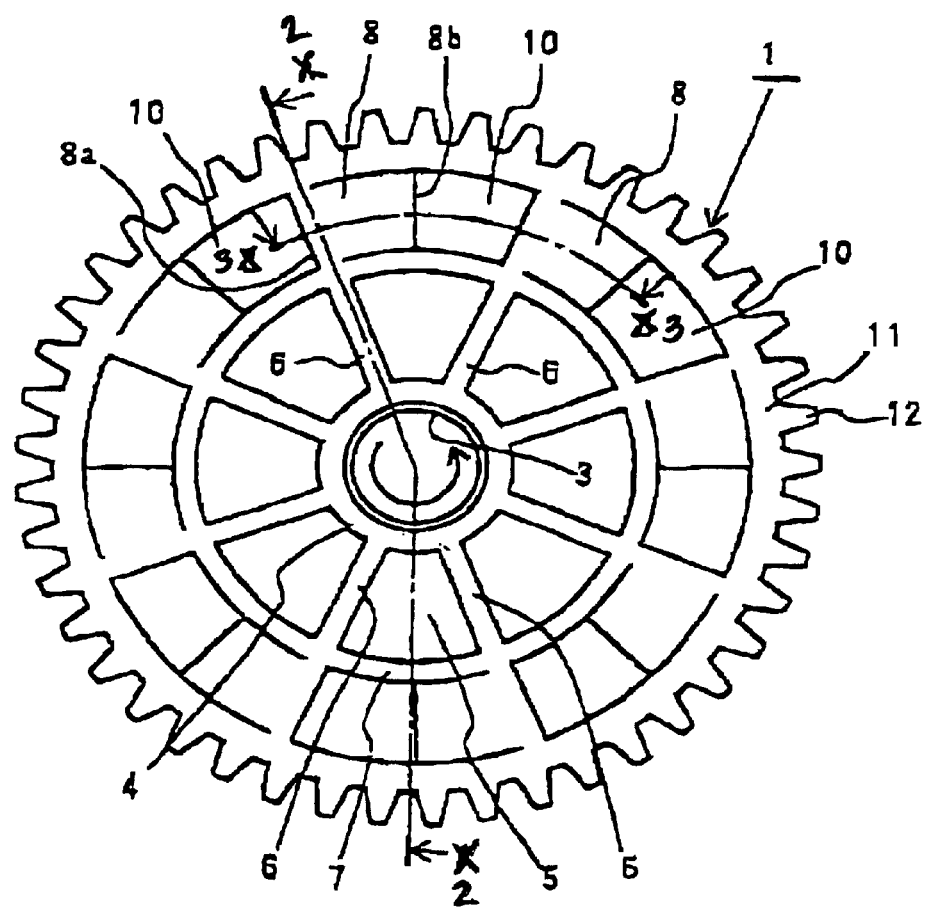
FIG. 1 is a front view of an injection-molded plastic gear according to a first embodiment of the present invention.
Figure 2:
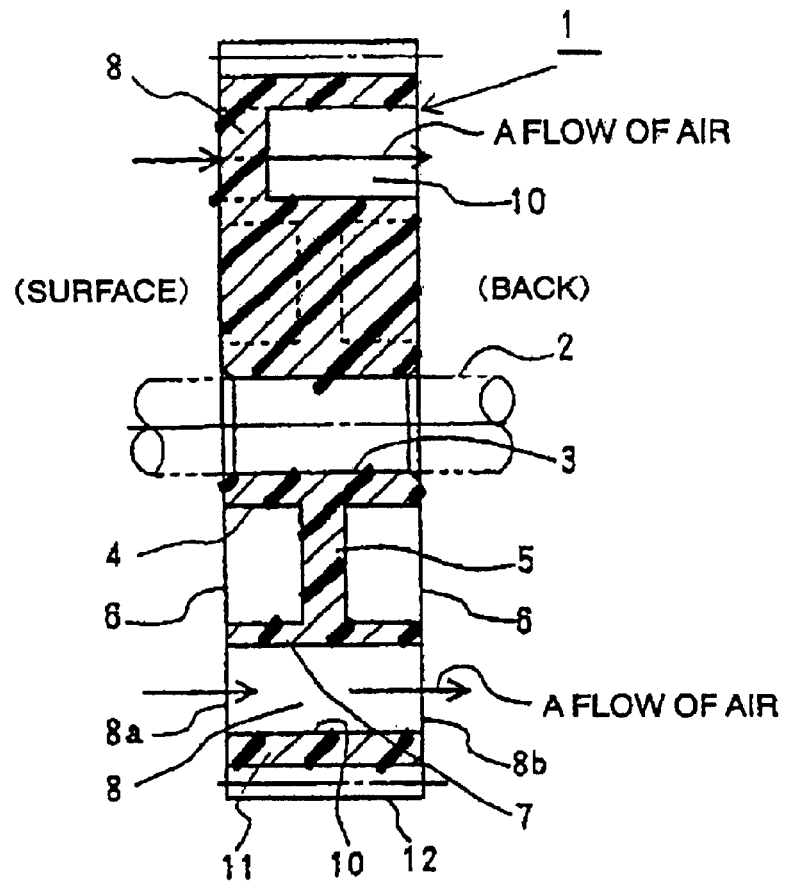
FIG. 2 is a sectional view taken along a line 2—2 in FIG. 1.
Figure 3:
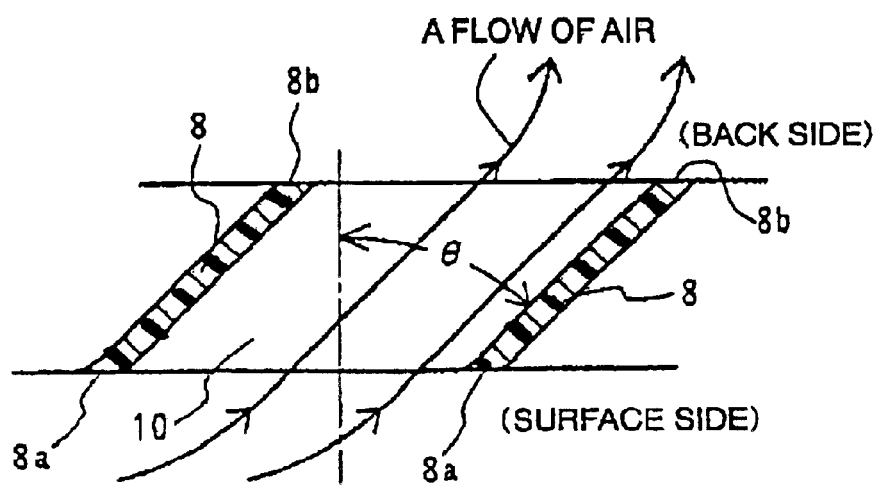
FIG. 3 is a sectional view taken along a line 3—3 in FIG. 1.

Referring to FIGS. 1 to 3, a gear 1 made of a plastic by an injection molding (which will be referred to as an injection-molded plastic gear hereinafter) is shown as a molded gear according to the present invention. The injection-molded plastic gear 1 according to the present embodiment includes a disk-shaped web 5 formed at an axially substantially central location around an outer periphery of a boss 4 having a shaft hole 3 into which a shaft 2 is fitted. Formed on each of opposite sides (a surface and a back) of the web 5 are a plurality of diametrical ribs 6 extending radiately from the outer periphery of the boss 4, and a substantially cylindrical circumferential rib 7 connecting the diametrical ribs 6 to one another in a circumferential direction. This ensures the reinforcement of the web 5 and provides a reduction in thickness of the web 5 and in its turn, a reduction in weight of the injection-molded plastic gear 1.

The injection-molded plastic gear 1 also includes a plurality of blades 8 formed at substantially equal distances around an outer periphery of the circumferential rib 7, and air-ventilating holes 10 each defined between the adjacent blades 8, 8, wherein each of the blades 8 forms a side edge of each hole 10 (see FIGS. 1 and 3). In the injection-molded plastic gear 1, a rim 11 is formed around outer peripheries of the blades 8, and a plurality of teeth 12 are formed around an outer periphery of the rim 11, whereby a spur gear having a fan function is formed.

Each of the blades 8 is formed in such a manner that it is inclined at a predetermined angle (θ) with respect to an axial direction, as shown in detail in FIG. 3, and so that its end 8a on the side of the surface is located on an extension of the corresponding diametrical rib 6, and its end 8b on the side of the back is located between such diametrical rib 6 and the next diametrical rib 6 on the right side as viewed in FIG. 1. Thus, when the injection-molded plastic gear 1 is turned in a counterclockwise direction as viewed in FIG. 1 (in a direction indicated by an arrow), the blades 8 produce an axial flow of air passed from the surface side of the injection-molded plastic gear 1 through the holes 10 to the back side of the gear.

When the injection-molded plastic gear 1 having such arrangement is turned upon the transmission of a power, the flow of air passed through the holes 10 defined on the side of an inner periphery of the rim 11 is produced by the blades 8. Therefore, a heat accumulated in the teeth 12 and the rim 11 by the friction of tooth faces or the like is transferred to the flow of air, whereby the teeth 12 and the rim 11 are cooled. Thus, in the injection-molded plastic gear 1 according to the present embodiment, a reduction in mechanical strengths such as fatigue strength due to a rise in temperature of the teeth and the rim 11 can be suppressed to ensure the transmission of the power stable in a long period.

If a bearing, a motor or the like (not shown) generating a heat is disposed on the back of the injection-molded plastic gear 1 in FIGS. 1 and 3, then the flow of air produced by the blades 8 can be blown to the heat-generating source such as the bearing, the motor or the like to cool the heat-generating source such as the bearing, the motor or the like and also to inhibit a rise in ambient temperature.

If an IC part (not shown) having a low degree of tolerance to heat is disposed on the back of the injection-molded plastic gear 1 in FIGS. 1 and 3, then the flow of air generated by the blades 8 can be blown directly to the IC part to cool it, or the IC part can be protected from the heat by inhibiting the rise in ambient temperature, as described above.

The injection-molded plastic gear 1 having the fun function as described above exhibits a peculiar effect as described above, when it is accommodated in a small-sized casing for an OA system, an AV system or the like adjacent another part, and when it is difficult a separate fan.

An addition, in the present embodiment, it is unnecessary to place a separate fan, because the injection-molded plastic gear 1 has the fan function, and hence, it is possible to reduce the number of components for an OA system, and AV system or the like in which the injection-molded plastic gear 1 to provide a reduction in price of an article such as the OA system, the AV system and the like and also to provide a reduction in size of the OA system, the AV system or the like.

In the present embodiment, the end of each of the blades 8 on the side of the surface is located on the extension of the corresponding diametrical rib 6 and hence, the flowing of the plastic (a molten material) during the injection molding is smooth and thus, a molding failure is difficult to arise.

Figure 4:
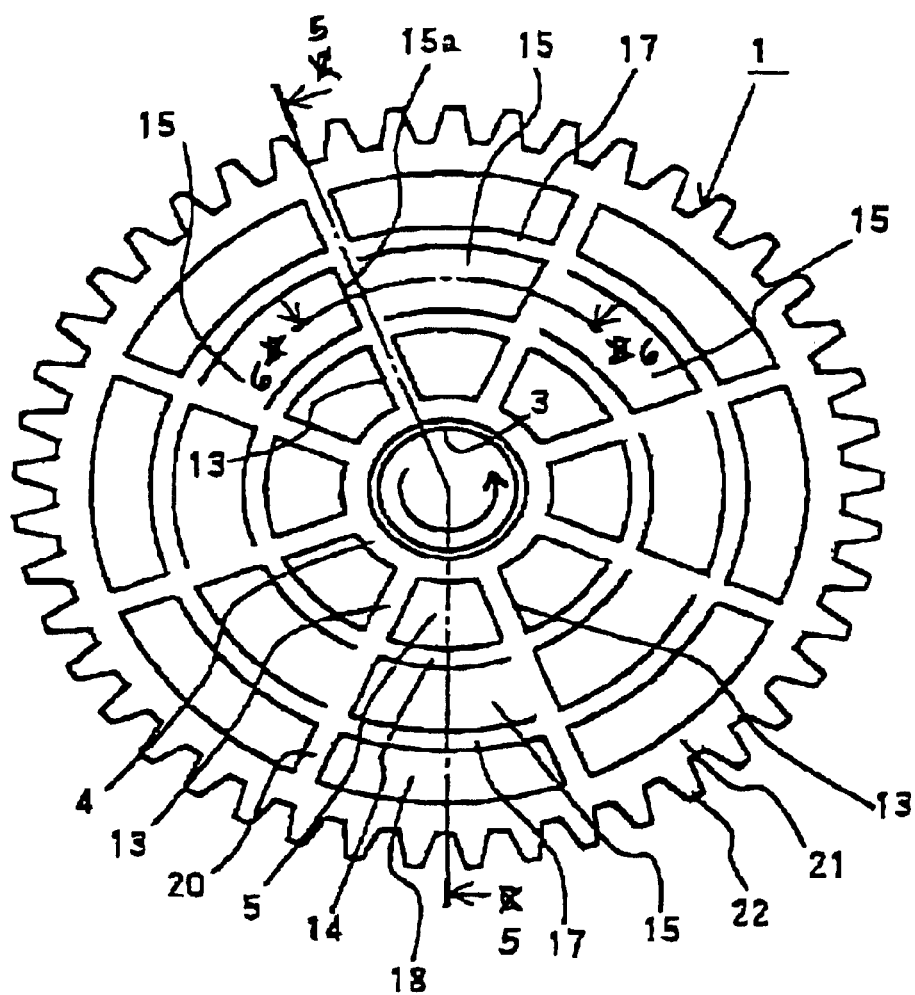
FIG. 4 is a front view of an injection-molded plastic gear according to a second embodiment of the present invention.
Figure 5:
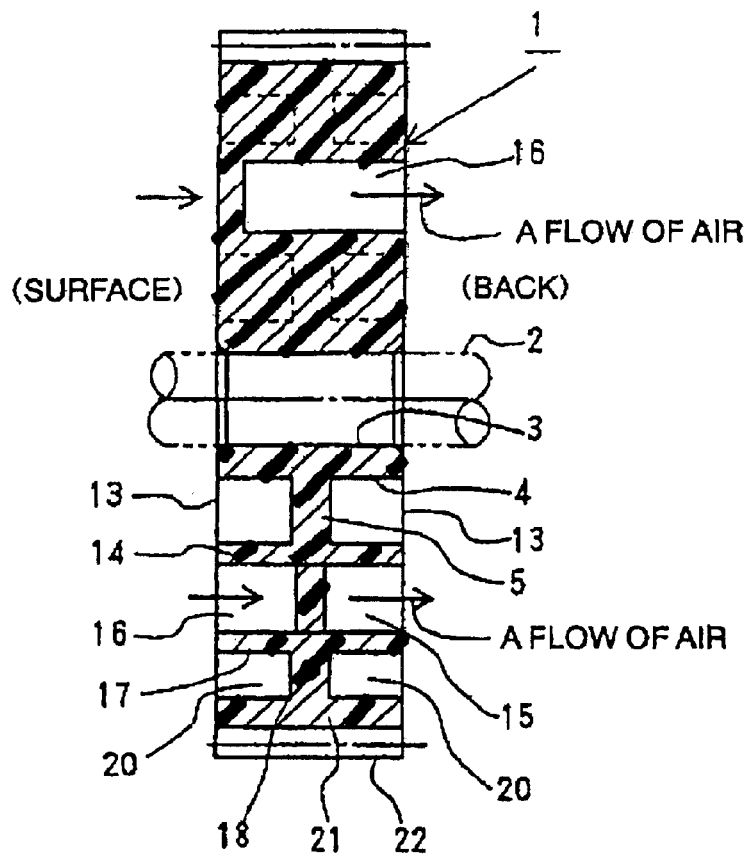
FIG. 5 is a sectional view taken along a line 5—5 in FIG. 4.
Figure 6:
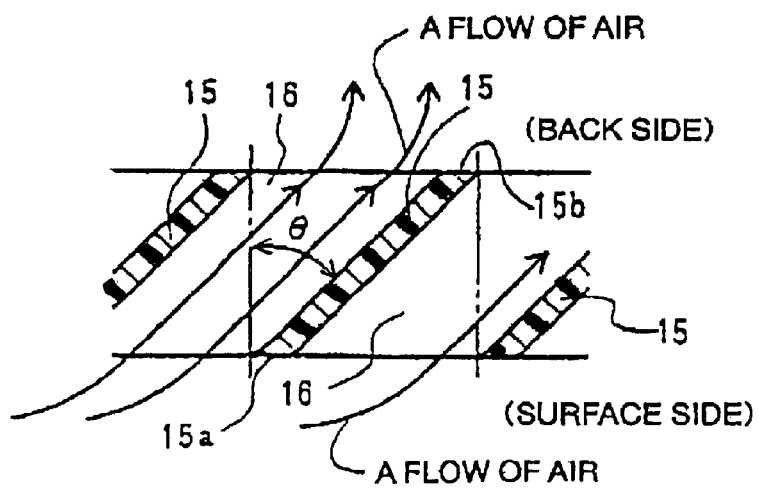
FIG. 6 is a sectional view taken along a line 6—6 in FIG. 4.

FIGS. 4 to 6 show a gear 1 made of a plastic by an injection molding as a molded gear according to a second embodiment of the present invention. As shown in FIGS. 4 to 6, the injection-molded plastic gear 1 according to the second embodiment includes a disk-shaped web 5 formed at an axially substantially central location around an outer periphery of a boss 4 having a shaft hole 3 into which a shaft 2 is fitted. Formed on each of opposite sides (a surface and a back) of the web 5 are a plurality of diametrical ribs 13 extending radiately from the outer periphery of the boss 4, and a substantially cylindrical circumferential rib 7 connecting the diametrical ribs 13 to one another in a circumferential direction. This ensures the reinforcement of the web 5 and provides a reduction in thickness of the web 5 and in its turn, a reduction in weight of the injection-molded plastic gear The injection-molded plastic gear 1 also includes a plurality of blades formed at substantially equal distances around an outer periphery of the circumferential rib 14, and air-ventilating holes 16 each defined between the adjacent blades 15, 15, wherein each of the blades 15 forms a side edge of each hole 16 (see FIGS. 4 and 6). In the injection-molded plastic gear 1, a circumferential rib 17 is formed around outer peripheries of the blades 15, and a web 18 is formed at a tooth-wise substantially central portion around an outer periphery of the circumferential rib 17. Diametrical ribs 20 are formed on opposite sides of the web 18. As a result, the web 18 is reinforced by the circumferential rib 17 and the diametrical ribs 20. A rim 21 is formed around outer peripheries of the diametrical rib 20 and the web 18, and a plurality of teeth 22 are formed around an outer periphery of the rim 21. Thus, the injection-molded plastic gear 1 is formed as a spur gear having a fan function.

Each of the blades 15 is formed in such a manner that it is inclined at a predetermined angle (θ) with respect to an axial direction, as shown in detail in FIG. 6, and so that its end 15a on the side of the surface is located on an extension of the corresponding diametrical rib 13, and its end 15b on the side of the back is located between such diametrical rib 13 and the next diametrical rib 13 on the right side as viewed in FIG. 4. Thus, when the injection-molded plastic gear 1 is turned in a counterclockwise direction as viewed in FIG. 4, the blades 15 produce an axial flow of air passed from the surface side of the injection-molded plastic gear 1 through the holes 16 toward the back side.

In the injection-molded plastic gear 1 having such arrangement, the blades 15 are formed at radially inner positions more spaced apart from the rim 21, as compared with those in the first embodiment. Therefore, it is difficult to cool the rim 21 and the teeth 22 directly by a flow of air produced by the blades 15, but the flow of air produced by the blades 15 can be blown to the other parts disposed adjacent the injection-molded plastic gear 1 to cool them, and also to inhibit a rise in ambient temperature by the cooling the other parts.

In the present embodiment, the rim 21 is supported by the web 18 and the diametrical ribs 20 and hence, the strengths of the rim 21 and the teeth 22 can be increased, as compared with those in the first embodiment.

Figure 7:
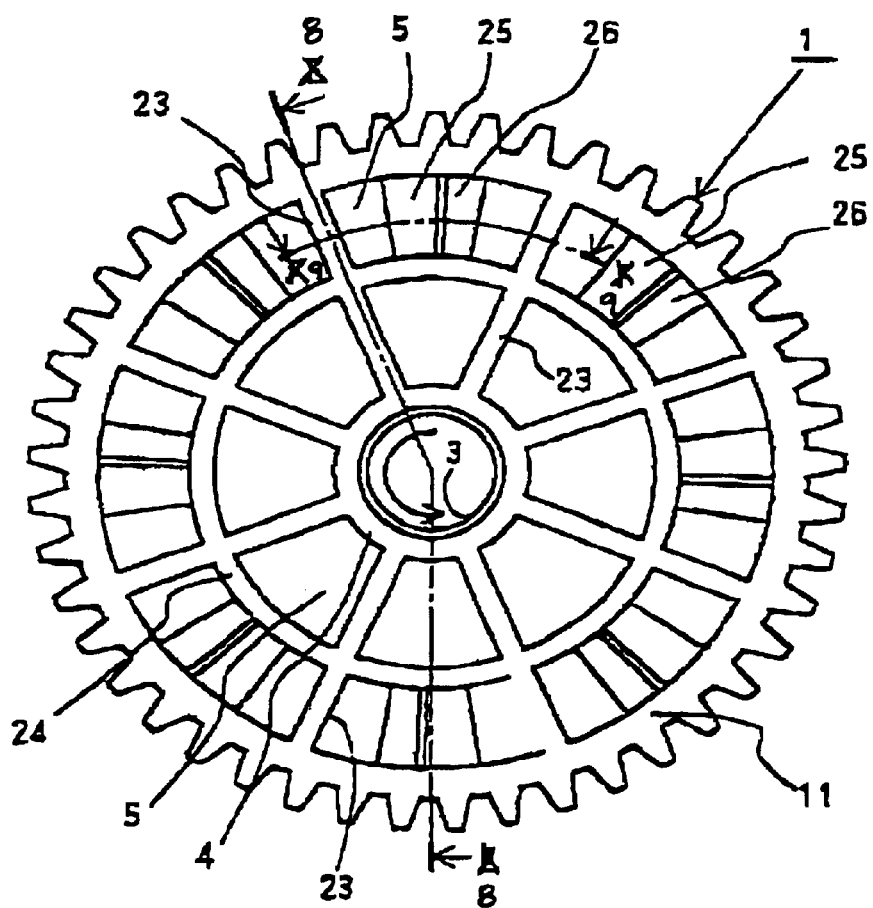
FIG. 7 is a front view of an injection-molded plastic gear according to a third embodiment of the present invention.
Figure 8:
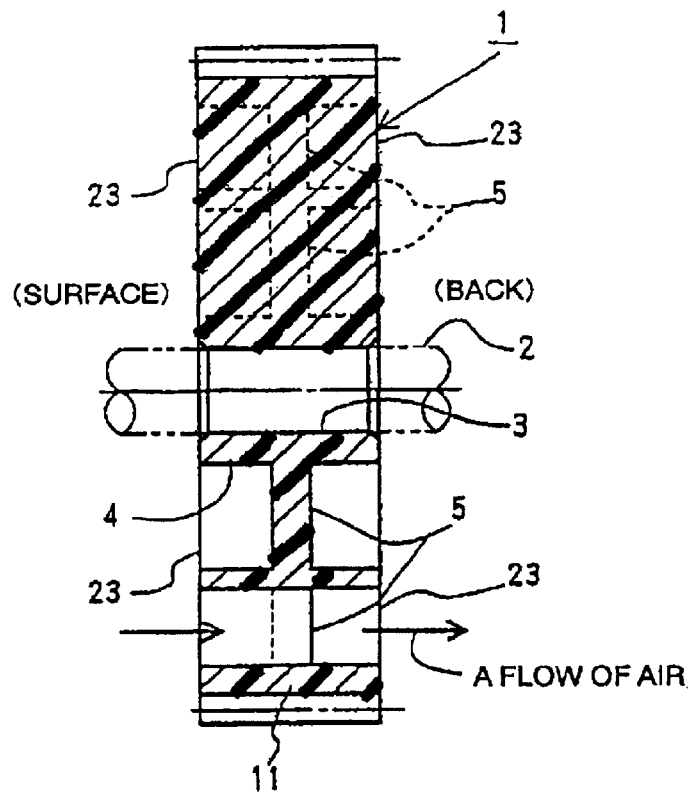
FIG. 8 is a sectional view taken along a line 8—8 in FIG. 7.
Figure 9:
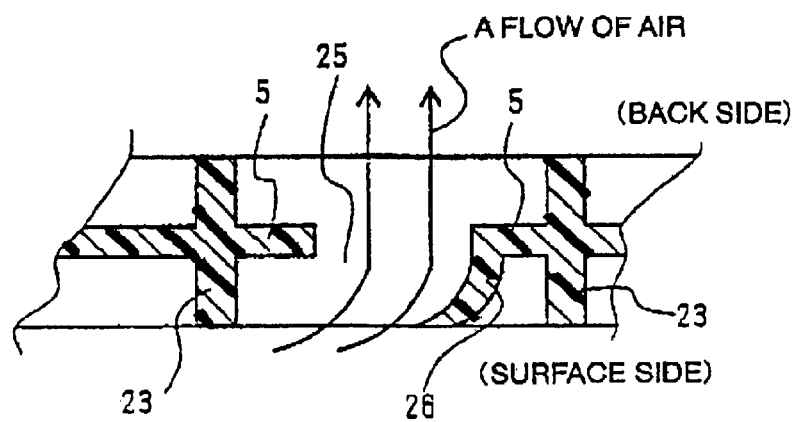
FIG. 9 is a sectional view taken along a line 9—9 in FIG. 7.

FIGS. 7 to 9 show an injection-molded plastic gear 1 according to a third embodiment of the present invention. As shown in FIGS. 7 to 9, the injection-molded plastic gear 1 according to the third embodiment includes a disk-shaped web 5 formed at an axially substantially central location around an outer periphery of a boss 4 having a shaft hole 3 into which a shaft 2 is fitted, and a rim 11 formed around an outer periphery of the web 5. A plurality of diametrical ribs 23 are formed on each of opposite sides of the web 5 to extend radiately from the boss 4 toward the rim 11, and a circumferential rib 24 is formed on each of the opposite sides (a surface and a back) of the web 5 to connect the diametrical ribs 23 to one another in a circumferential direction. Holes 25 are defined in the web 5 between the adjacent diametrical ribs 23, 23 on the side of an inner periphery of the rim 11 to extend through the surface and back of the web 5, and a substantially disk-shaped blade 26 is formed at a side edge of each of the holes 25.

Even with the injection-molded plastic gear 1 having such arrangement, an effect similar to that in each of the first and second embodiments can be provided.

In the injection-molded plastic gear 1 according to the present embodiment, the diametrical ribs 23 extend from the boss 4 to the rim 11, and the hole 25 is defined between the adjacent diametrical ribs 23, 23. Therefore, the rigid of the plastic gear 1 can be enhanced more than those in the first and second embodiments.

In each of the above-described embodiments, the shape of the blades 8, 15, 26, the inclination angle of the blades 8, 15 and the size of the holes 10, 16, 25 are determined properly depending on the service conditions and the like of the injection-molded plastic gear 1.

Although the injection-molded plastic gear 1 as a molded gear has been described as an example in each of the above-described embodiments, the present invention is not limited to such plastic gear 1 and is applicable to a gear formed of a metal such as a magnesium alloy, an aluminum alloy and the like by a die-casting. The metal gear has a good thermal conductivity and hence, a heat is difficult to be accumulated in teeth. In addition, the mechanism strength of the metal gear is not dependent on heat, unlike the plastic gear, and hence, the metal gear has a large effect that a flow of air can be blown to a part disposed adjacent the teeth to cool it by an effect of cooling the teeth.

As described above, the molded gear is produced by cooling and solidifying the molten material such as the plastic and the metal in the mold and hence, even the complicated shapes of the holes 10, 16 and the blades 8, 15, 26 can be formed easily and accurately. Therefore, according to each of the above-described embodiments, the gear having the fun function can be produced in bulk and at a low cost.

The embodiments haven been described by way of the spur gear, but the present invention is not limited to it, and is applicable to a helical gear and another power-transmitting gear.

Figure 10:
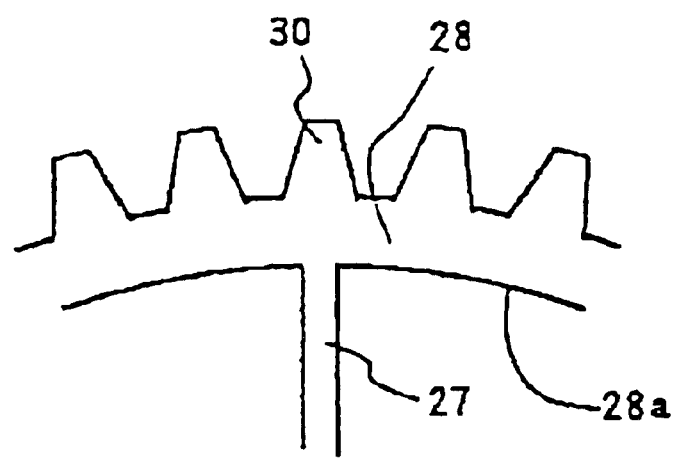
FIG. 10 is an enlarged view of a portion of a rim.
Figure 11:
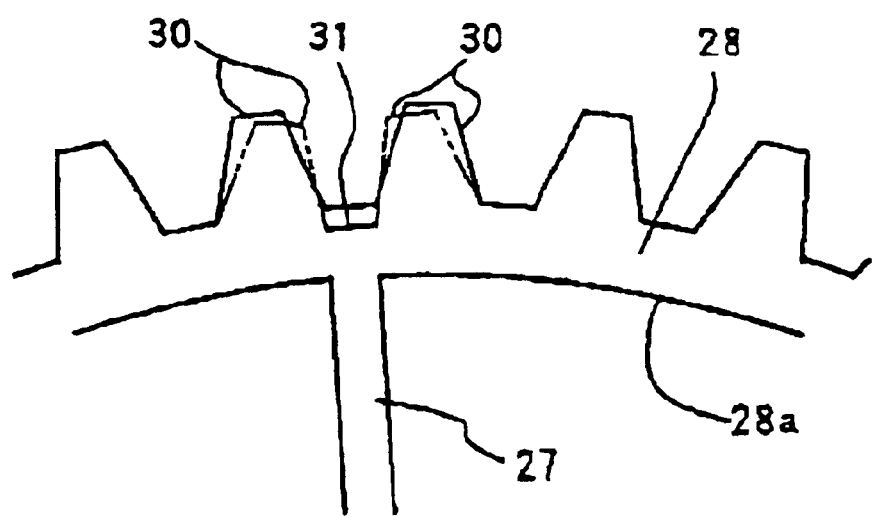
FIG. 11 is a view showing a rim and a diametrical rib in connected states in which a disadvantage may be arisen.

When the outer peripheral end of a diametrical rib 27 is connected to the inner peripheral surface 28a of a rim 28, the diametrical rib 27 is connected to the inner peripheral surface 28a of the rim 28 at a location corresponding to each of teeth 30, as shown in FIG. 10. This is because if the diametrical rib 27 is connected to the inner peripheral surface 28a of the rim 28 at a location corresponding to a tooth root 31, as shown in FIG. 11, the falling of the teeth 30 as shown by dashed lines in FIG. 11 occurs, resulting in a degraded accuracy of formation of the teeth 30.

When the molded gear is formed in the form of a helical gear, blades are formed on the inner peripheral surface 28a of the rim 28 at locations corresponding to the teeth 30, as shown in FIG. 10. Namely, in the helical gear, the blades are formed along the torsion of the teeth 30, whereby the falling of the teeth 30 as shown by dashed lines in FIG. 11 can be prevented, leading to an enhanced accuracy of formation of the teeth 30.

In addition, the web 5, 18 is formed so that it is located at the axially substantially central portion of the boss 4 in each of the above-described embodiments, but the present invention is not limited to such arrangement of the molded gear and is applicable to a molded gear in which the web 5, 18 is formed at the axial end of the boss 4, and the rim 11, 21 is supported in a cantilever manner on the web 5, 18, and to a molded gear of another structure. Thus, the present invention is applicable widely to a molded gear having a structure provided with air-ventilating holes made to extend through a portion radially inner than the teeth from the surface to the back, and blades for producing a flow of air passed through such air-ventilating holes.

The injection-molded plastic gear 1 according to each of the embodiments is designed so that when it is rotated in the counterclockwise direction, the blades 8, 15, 26 produce the flow of air directed from the surface side to the back side of the injection-molded plastic gear 1, as shown in FIGS. 1, 4 and 7. However, when the injection-molded plastic gear 1 is rotated in a clockwise direction, the blades 8, 15, 26 maybe formed so that they are inclined in a direction opposite from the direction of inclination of the blades 8, 15, 26 shown in FIGS. 1, 4 and 7, so that a flow of air directed from the surface side to the back side of the injection-molded plastic gear 1 is produced by the blades 8, 15, 26.

Each of the embodiments has been illustrated in which the boss 4 having the shaft hole 3 is formed at the central portion of the injection-molded plastic gear 1, but the present invention is not limited to the embodiments, and the shaft may be formed directly at the central portion of the injection-molded plastic gear 1.

What is claimed is:

1. A molded gear made entirely of plastic by injection molding and comprised of an inner shaft hole, a web, a rim, formed around an outer periphery of the web, a plurality of teeth on said rim, a circumferential rib provided between said inner shaft hole and said rim and a plurality of diametrical ribs extending radially from said shaft hole to said rim, wherein a plurality of holes are defined circumferentially in a portion radially inner than said teeth to extend through said radially inner portion of said web from a front side to a back side of said gear, said diametrical ribs are formed, at one side edge of each of said holes, a plurality of blades are formed so as to extend inclinely with respect to an axial direction from said front side toward said back side, an end of each of said blades on said front side is an extension of a corresponding diametrical rib, and each of said plurality of blades is provided on said circumferential rib.

2. The molded gear according to claim 1, wherein another end of each of said blades is located between said diametrical rib and a diametrical rib that is located next to said diametrical rib.

3. The molded gear according to claim 1, wherein another end of each of said blades extends up to a vicinity of a diametrical rib that is located next to said diametrical rib.

4. A molded gear made entirely of plastic by injection molding and comprised of an inner shaft hole, a plurality of diametrical ribs extending radially, a web, a rim, a circumferential rib between said inner shaft hole and said rim and a plurality of teeth formed around an outer periphery of said rim, wherein a plurality of blades which produce an axial air flow when said gear is rotated are formed at distances circumferentially on an inner peripheral surface of said rim, an end of each of said blades on a surface side of said gear is located on an extension of a corresponding diametrical rib that is formed on said surface side and extends inclinely from said front side toward said back side of said gear, and each of said plurality of blades is provided on said circumferential rib.

5. The molded gear according to claim 4, wherein another end of each of said blades is located between said diametrical rib and a diametrical rib that is located next to said diametrical rib.

6. The molded gear according to claim 4, wherein another end of each of said blades extends up to a vicinity of a diametrical rib that is located next to said diametrical rib.

* * * * *